(12) United States Patent
Hyerle

(10) Patent No.: US 8,204,194 B2
(45) Date of Patent: Jun. 19, 2012

(54) COMMUNICATION SYSTEM AND METHOD

(75) Inventor: Robert H. Hyerle, Bernin (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 1175 days.

(21) Appl. No.: 11/768,429

(22) Filed: Jun. 26, 2007

(65) Prior Publication Data

US 2008/0013704 A1    Jan. 17, 2008

(30) Foreign Application Priority Data

Jul. 11, 2006   (EP) .................................... 06300791

(51) Int. Cl.
*H04M 3/42* (2006.01)
(52) U.S. Cl. ................................. 379/201.01
(58) Field of Classification Search ............. 379/201.01, 379/201.1, 207.12; 370/474; 455/404.2, 455/456.1, 457
See application file for complete search history.

(56) References Cited

U.S. PATENT DOCUMENTS 6,807,423 B1   10/2004   Armstrong et al.
2005/0213609 A1*   9/2005   Brusilovsky et al. ......... 370/474

FOREIGN PATENT DOCUMENTS

EP          1 575 253 A1     2/2005
WO      WO 01/45342 A2     6/2001

* cited by examiner

*Primary Examiner* — Thjuan K Addy

(57) ABSTRACT

A method of determining information relating to one or more users of one or more communication devices in a communication system comprising receiving a request for information, retrieving data relating to an association between communication devices and users identified in the request, obtaining presence information relating to communication devices in the communication system, and supplying the information, the information being determined in part on the obtained presence information and in part on the retrieved association data.

17 Claims, 3 Drawing Sheets

COMMUNICATION SYSTEM AND METHOD

FIELD OF THE INVENTION

The present invention relates generally to the field of communications.

BACKGROUND OF INVENTION

Communication devices are generally either personal communication devices or shared communication devices. Personal communication devices are generally operated by a single person and communications established to such devices are typically answered only by that person. Shared communication devices, on the other hand, may operated by, and communications established to such devices may be answered by, any authorized person within the vicinity of the device.

An example of a shared communication device is a household landline telephone. An example of a personal communication device is a mobile telephone.

Take, by way of example, a typical scenario of a family household, having a shared landline telephone available for use by all members of the family. Each member of the family may make calls therefrom and answer calls made thereto if they are suitably available. As is also common nowadays, some or all of the members of the family may also have a personal communication device such as a mobile telephone.

Despite the fact that most or every family member may have a mobile telephone, it is in many cases desirable to call a family member on the shared family phone rather than via that family member's mobile telephone. This desire may be due for a number of reasons. For example, calls made to landline telephones may be considerably cheaper than calls made to mobile telephones. Additionally, from a social point of view, a caller may have a desire to speak to someone of the household, without having a specific desire to speak to anyone in particular. A caller may also wish to speak to more than one family member during the same telephone call.

Currently, however, a caller calling a shared telephone has no way of knowing who is available at that shared device. Generally, the best a caller can do is to use some personal knowledge, such as by knowing at what times different family members are likely to be present, and applying that knowledge to determine whether the desired person is likely to be available at the shared device. However, such an approach is somewhat unsatisfactory.

Accordingly, one aim of the present invention is to overcome, or at least alleviate, at least some of the above-mentioned problems.

SUMMARY OF THE INVENTION

According to a first aspect of the present invention, there is provided a method of determining information relating to one or more users of one or more communication devices in a communication system. The method comprises receiving a request for information; retrieving data relating to an association between communication devices and users identified in the request; obtaining presence information relating to communication devices in the communication system; and supplying the information, the information being determined in part on the obtained presence information and in part on the retrieved association data.

Advantageously the method enables diverse information to be determined, such as, for instance, information about which users are available at a given device, or on which devices a given user is available.

According to a second aspect of the present invention, there is provided apparatus for determining information relating to one or more users of one or more communication devices in a communication system. The apparatus comprises means for obtaining presence information relating to communication devices in the communication system, a database for storing data relating to communication devices and the users associated therewith, and means for supplying the information, the information being determined in part on the obtained presence information, and in part on the association data.

BRIEF DESCRIPTION OF THE DRAWINGS

Embodiments of the present invention will now be described, by way of non-limiting example only, with reference to the accompanying drawings, in which.

DETAILED DESCRIPTION OF EMBODIMENTS OF THE INVENTION

Figure 1:
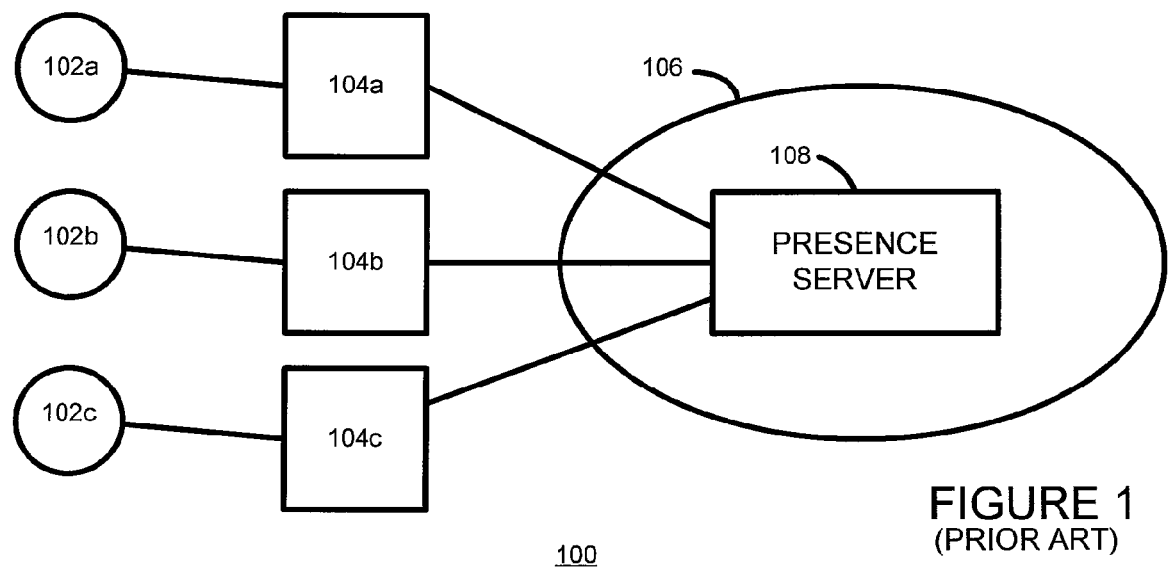
FIG. 1 is a block diagram showing a simplified view of a communication system according to the prior art.

Referring now to FIG. 1, there is shown a communication system 100 according to the prior art. A number of users 102a, 102b and 102c are shown. Each user 102a to 102c is associated with a communication device 104a to 104c and each communication devices is connected to a suitable network 106. Each of the communication devices 102a, 102b and 102c includes a presence application that enables a presence status indicative of the availability or willingness of the user of the device to partake in communications to be determined. The determined presence status is published to a presence server 108. Typical presence statuses include 'available', 'in a meeting', 'do not disturb', etc. and may additionally include user defined presence statuses. The communication devices 102a, 102b and 102c may be suitably an instant messaging application, a voice over Internet protocol (VoIP) application, a smartphone, or the like.

A user wishing to establish a communication with one of the users 102a, 102b or 102c may interrogate the presence server 108 prior to establishing the communication to determine the user's presence status.

One problem with current presence systems is that they are generally only suitable for personal communication devices, since the presence status is based on the activity or availability of a single user having control of a device.

Furthermore, many devices, such as conventional landline telephones and mobile telephones do not generally include presence applications, and therefore are typically unable to publish a presence status to a presence server.

Figure 2:
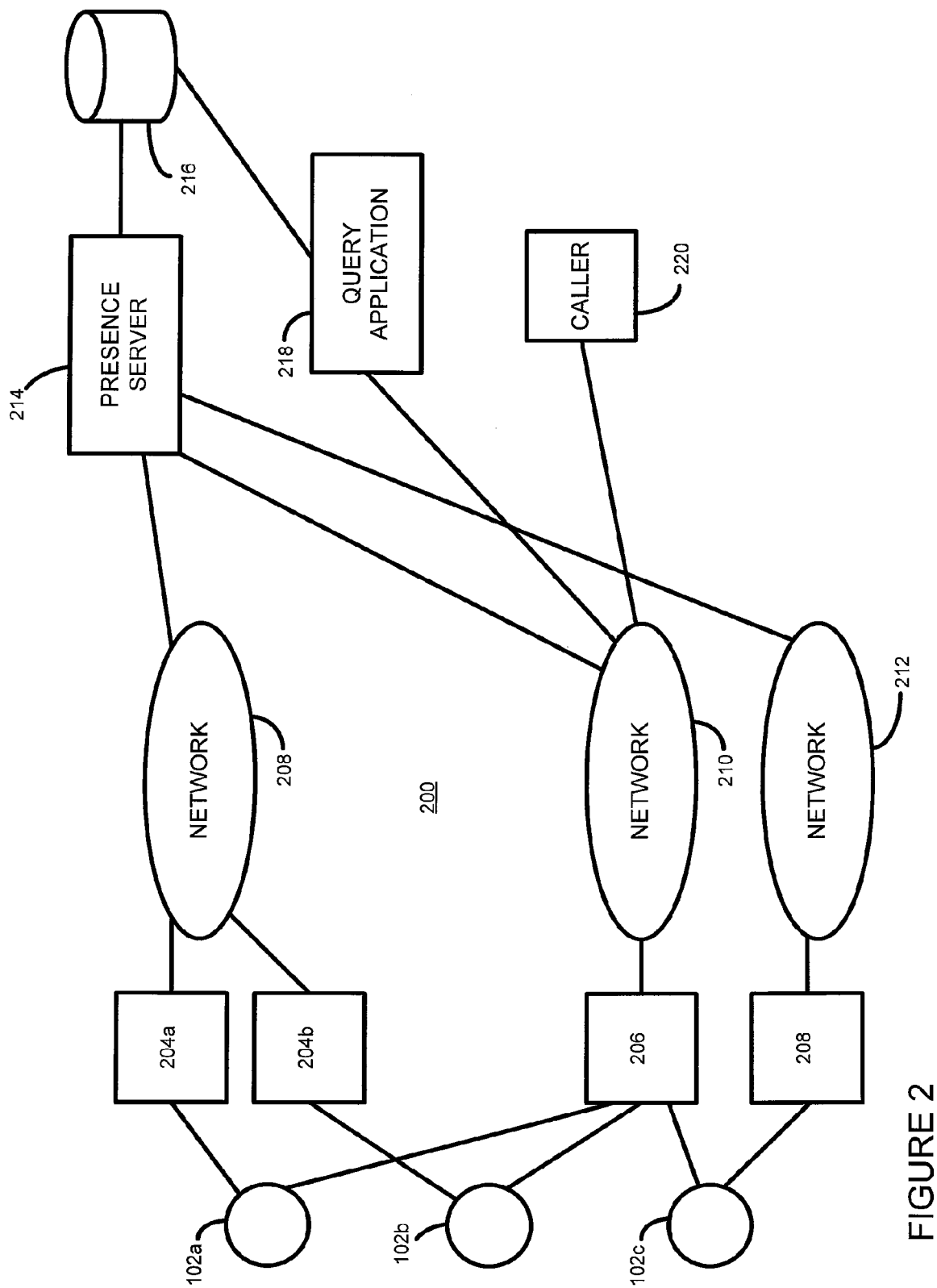
FIG. 2 is a block diagram showing a simplified view of a communication system according to one embodiment.

Referring now to FIG. 2 there is a shown a block diagram of a system 200 according to an embodiment of the present invention.

A number of users 102a, 102b and 102c are associated with one or more communication devices 204a, 204b, 206 and 208. The communication devices 204a, 204b, 206 and 208 could be, for example, mobile telephones, landline telephones, smartphones, computing devices, and the like. For the purposes of the present example, communication devices 204a and 204b are mobile telephones, communication device 206 is a landline telephone and communication device 208 is a SIP presence capable phone.

Mobile telephones 204a and 204b may be connected to a mobile telephone network 208, landline telephone 206 may be connected to a public switched telephone network (PSTN) network 210, and SIP phone 208 may be connected to an Internet protocol (IP) network 212. In the present example, users 102a to 102c represent members of a family, for example user 102a may be the father, user 102b may be the mother, and user 102c may be the daughter.

The father 102a, the mother 102b and the daughter 102c share the home landline telephone 206 and in addition thereto the father 102a has a personal mobile telephone 204a, the mother 102b has a personal mobile telephone 204b and the daughter 102c has a personal SIP phone 208.

Although the devices 204a, 204b and 206 are not presence capable devices, i.e. they do not have a presence application capable of publishing a presence status to a presence server, a basic presence status is available via their respective networks. For example, the presence server 214 can obtain a simple 'in a call' or 'not in a call' presence status by interrogating networks 208 and 210. Presence information from the SIP phone 208, which is a presence capable telephone, is published by a presence application on the SIP phone 208 to the presence server 214.

For simplicity, only a single presence server 214 is shown, however it will be appreciated that, in an alternative embodiment, different presence servers may exist for each of the networks 208, 210 and 212, in which case the presence server 214 may perform a consolidation function of the presence information obtained from each of the different presence servers.

Those skilled in the art will appreciate that the presence information of presence capable devices, such as the SIP phone 208, may include a wide-range of presence statuses, including 'available', 'away', 'in a meeting, 'do not disturb' and so on.

Included in the presence information obtained by the presence server 214 may be location information relating to the current location of the communication device. For example, for a landline phone, the location information may include address information or geographical coordinate information, such as GPS coordinates and the like. For a mobile telephone, location information may include information relating to the mobile cell in which the mobile telephone is currently located, geographical coordinates, such as longitude and latitude coordinates, and the like. Such geographical coordinate information may be obtained, for example through an on-board GPS receiver or the like.

The presence server 214 maintains a database 216 with information obtained from each of the communication devices 204a, 204b, 206 and 208, as shown below in Table 1. Each communication device is identified in the database 216 by a communication device identifier, such as the telephone subscriber number attributed to that device.

In addition to presence information the database 216 additional includes details of which users, identified by way of a user identifier, are associated with each communication device. The associated user information may be obtained in any suitable manner, such as, for example, supplied by each user through a suitable web application, derived by the presence server 214 from publicly available information, and so on.

For clarity of explanation, Table 1 shows the location information by way of a textual descriptor representing a geographical location. Those skilled in the art will appreciate that geographical coordinates may also be stored therein.

TABLE 1

| DEVICE IDENTIFIER | STATUS | LOCATION | ASSOCIATED USER IDENTIFIER |
|---|---|---|---|
| 204a (Dad's mobile) | Available | At home | 102a (Dad) |
| 204b (Mum's mobile) | Not available | At home | 102b (Mum) |
| 206 (Family phone) | Available | At home | 102a (Dad) |
| | | | 102b (Mum) |
| | | | 102c (Daughter) |
| 208 (Daughter's SIP phone) | Away | At school | 102c (Daughter) |

The information in the database 216 may be obtained and maintained in any suitable manner. For example, information in the database 216 may be updated whenever the presence status of a communication device changes, may occur periodically, or may occur whenever data in the database 216 is queried.

In one embodiment, when a caller 220 places a call to the shared telephone 206 a call establishment request is sent to the network 210 in a generally known manner. The network 210 may recognize, for example through use of a suitably configured service control point (not shown), that the called number is that of a shared communication device. The network 210 then sends the device identifier or called number to a query application 218 to determine which of the users associated with the telephone 206 are likely to be available.

Figure 3:
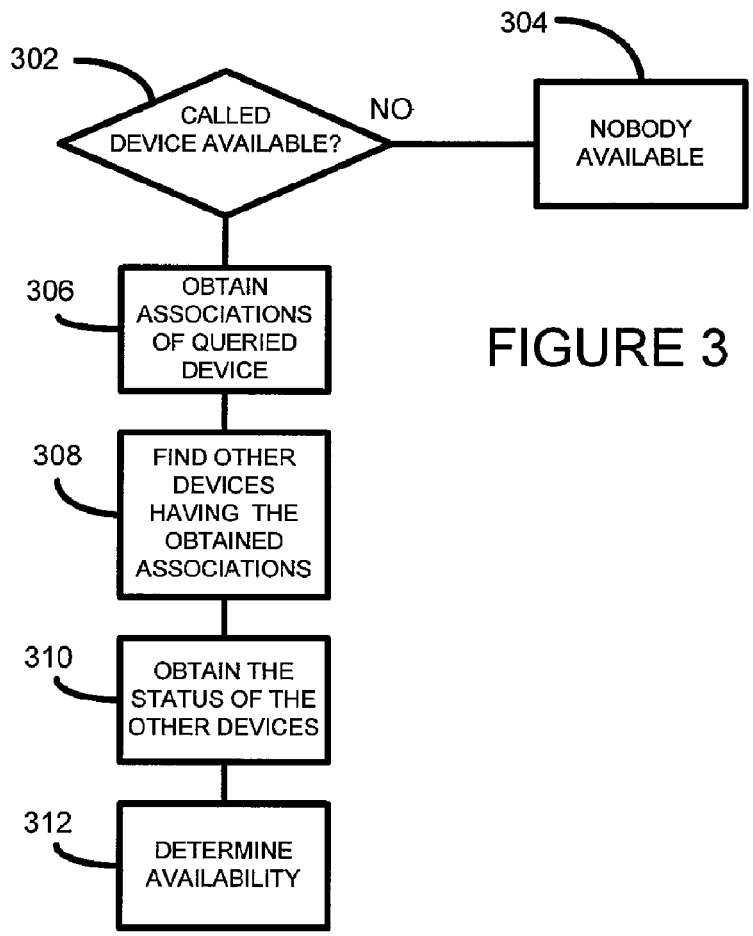
FIG. 3 is a flow diagram outlining example processing steps according to one embodiment of the present invention.
Figure 4:
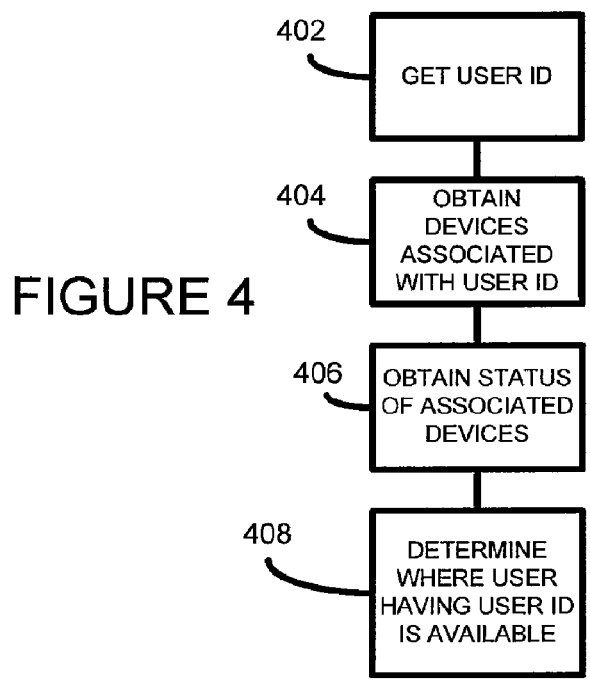
FIG. 4 is a flow diagram outlining example processing steps according to one embodiment of the present invention.

The operation of the query application 218 is described below with further reference to the flow diagram of FIG. 3.

At step 302 the presence status of called device is queried. The query application obtains the presence status either by sending a request to the presence server 214 or, alternatively, by querying the database 216 directly. If the called device is unavailable, for example if the called device is currently in a call, it is determined that nobody is available at that device (step 304). In an alternative embodiment the network 210 may determine whether the called device is available and may omit invoking the query application 218 where it is determined that, for example, that the called device is currently in a call.

If it is determined that the called device 206 is available the query application 218 queries the database 216 to obtain the user identifiers of any users associated with that device (step 306). In the present example, the database 216 records that users 102a (Dad), 102b (Mum) and 102c (daughter) are associated with the telephone 206.

At step 308, the query application 218 queries the database 216 to obtain, for each user identifier associated with the called device, the device identifiers of any other communication devices associated with each of those user identifiers. In the present example it can be seen that user 102a (dad) is additionally associated with device 204a (dad's mobile phone), user 102b (mum) is additionally associated with device 204b (mum's mobile phone), and user 102c (daughter) is additionally associated with device 208 (daughter's SIP phone).

At step 310, the query application 218 queries the database 216 to determine the presence statuses and location information of all of the associated device identifiers. In the present example it can be seen, as shown in Table 2, that the following information is retrieved from the database 216:

TABLE 2

| DEVICE IDENTIFIER | STATUS | LOCATION |
|---|---|---|
| 206 (Home phone) | Available | Home |
| 204a (Dad's mobile phone) | Available | Home |
| 204b (Mum's mobile phone) | Not Available | Home |
| 208 (Daughter's SIP phone) | Away | At school |

From this information, along with the retrieved association information, the query application 218 can determine (step 312) the availability of each of the user identifiers associated with the called device.

For example, the location of the home phone 206 is known, and is herein referred to as 'home'. Dad (102a) is associated with the home phone (206), and dad's mobile phone (204a) indicates that it is located in the 'home' location and is available. In can thus be inferred that dad (102a) may be available on the home phone (206).

Similarly, mum (102b) is associated with the home phone (206), and mum's mobile phone (204b) indicates that it is located in the 'home' location but that it is not available. It can thus be inferred that mum (102b) is likely engaged in a call on her mobile telephone, but that she may be available to answer the home phone (206).

Finally, daughter (102c) is associated with the home phone (206), and the daughter's SIP phone (208) indicates that it is located in the 'school' location but that she is 'away' from her SIP phone. It can thus be inferred that daughter (102c) is not available on the home phone (206).

The query application 218 returns the determined availability information to the network 210 for presentation to the caller 220. For example, the network 210 may transform the determined availability information into a spoken message that is played to the caller by way of a ringing back tone. Thus, in the current example the caller would here the spoken message "Thanks for calling. On this number dad is available, mum may be available, and daughter is not available". On the basis of this message the caller can determine whether to continue the call or not.

The query application 218 may be arranged to provide details of on which devices, other than on the called device, the users associated with the called device may be reached. For example, a caller to the device 206 may be presented with the message "Thanks for calling. On this number dad is available, mum may be available, and daughter is not available. Your may also reach dad on his mobile telephone, you may leave a message on mum's voice mail, and you may leave a message on daughters SIP phone". The message may additionally include the telephone subscriber number or other contact information of each user associated with the called device and may offer the caller an opportunity to be directly connected to one of the communication devices listed in the message by pressing an appropriate key.

The query application 218 may also be arranged to provide details of which users are in the vicinity of a called device. For example if a call is placed to device 204a (dad's mobile) the query application 218 may be arranged to determine whether any other devices are in the same location. For example, the query application may determine that dad is available at location X on his mobile telephone, and the mum is also in the same location.

In a further embodiment the caller 220 can directly access the query application 218 in any suitable manner. For example, if the query application 218 has a suitable voice application interface the caller 220 may place a call to directly to the query application 218. If the query application 218 has a suitable web application interface the caller 220 may directly access the query application 218 through a suitable web browser application. The caller 220 can then supply the telephone subscriber number or device identifier of the device 206 to determine which users are available at that device, in a similar manner to that described above. Depending on the determined availability the query application 218 may give the caller 220 the opportunity to be connected to the device 206 in any suitable manner, such as by way of a conventional telephone call, a voice over Internet protocol (VoIP) call, and the like.

In a yet further embodiment, the query application 218 is arranged to determine on which device or devices a given user is available. For example, the caller 220 accesses the query application 218, as described above and supplies a user identifier of the person (step 402). The user identifier can be any suitable unique or substantially unique identifier, for example, a personal telephone, such as a mobile telephone number of the user, a personal email address, or the like.

The query application 218 resolves, if required, the supplied user identifier to a user identifier stored in the database 216. The query application 218 searches the database 216 to determine (step 404) all devices associated with that user identifier. At step 406 the status of those devices is obtained from the database 216 and at step 408 the query application determines on which communication devices the user having the supplied user identifier is available.

In a still further embodiment the query application 218 enables one or more alerts to be programmed based on one or more conditions. For example, a caller may wish to call user 102a (dad) on the device 206, but only if users 102b (mum) and 102c (daughter) are not at home or are not available. A further example query may be to alert a caller when user 102a (dad) is available on device 206 but not when device 204b (mum's mobile telephone) is located in the same area.

These and other conditions can be set up in any appropriate manner and the query application 218 periodically tests the condition. If the query application 218 determines that the condition is true an alert may be triggered. An alert may include, for example, the establishment of a telephone call between the caller and the user, a short message (SMS), an email, or the like.

In a still further embodiment a user can add rules to the database 216 that can be tested whenever information about the user or a device associated with that user is obtained from the database 216. For example, a user may wish to use status of his mobile telephone as a global presence status indicator. For example, a user may set up a rule in the database 216 such that if the status of the mobile telephone is 'switched off' the query application 218 determines that the user is not available at any other device.

The invention claimed is:

1. A method of determining information relating to one or more users of one or more communication devices in a communication system, comprising:
    receiving a request for information inquiring regarding a status of a user at a shared communication device;
    retrieving data relating to the request;
    determining the status of the user at the shared communication device based on the retrieved data, the data having a device identifier for a personal communication device of the user, a corresponding status of the personal communication device, and a location of the personal communication device in the communication system; and
    supplying the requested information.

2. The method of claim 1, wherein the step of supplying the information is adapted for determining the identities of users available at the shared communication device.

3. The method of claim 1, further comprising receiving the request in response to a communication device sending a communication establishment request to a communication network.

4. The method of claim 3, wherein the step of supplying the information further comprises sending the information to the communication device having made the communication establishment request.

5. The method of claim 1, further comprising determining a desired combination of available users and devices and generating an alert when the desired combination is detected.

6. Apparatus for determining information relating to one or more users of one or more communication devices in a communication system, comprising:
    means for obtaining presence information relating to shared communication devices in the communication system;
    a database for storing data relating to location of personal communication devices and the users associated therewith; and
    means for supplying the presence information, the presence information being determined in part based on the location information of the personal communication devices, and in part on the users associated therewith.

7. A system for identifying a user available at a communication device common to a plurality of different users, comprising:
    a database stored in a non-transient computer readable medium in a server device, the database having a device identifier for personal communication devices and the communication device common to the plurality of different users, and corresponding status, location, and user identifier for each of the communication devices;
    a query application executable by a processor in the server device, the query application operatively associated with the database to provide an inquiring user with the availability of a particular user at the communication device common to the plurality of different users based at least in part on the location and the status of the personal communication devices.

8. The system of claim 7, wherein the communication device common to the plurality of different users is a PSTN phone without personal identification capabilities.

9. The system of claim 7, wherein the personal communication device is a mobile phone.

10. The system of claim 7, wherein the query application returns the availability of the particular user at the communication device common to the plurality of different users to a requesting device.

11. The system of claim 7, wherein the query application identifies which other devices the user is available at when the user is not available at the communication device common to the plurality of different users.

12. The system of claim 11, wherein the query application directly connects to one of the other devices the user is available at when the user is not available at the communication device common to the plurality of different users.

13. The system of claim 7, wherein the query application provides details for leaving a message when the user is not available at the communication device common to the plurality of different users.

14. The system of claim 7, wherein the query application provides details whether any other devices and other users are in a same location.

15. The system of claim 7, wherein the particular user is identified by a unique identifier.

16. The system of claim 7, wherein the query application alerts a caller based on at least one condition.

17. The system of claim 16, wherein the at least one condition is location of another user.

* * * * *